United States Patent [19]

Schiller

[11] Patent Number: 4,763,048
[45] Date of Patent: Aug. 9, 1988

[54] METHOD AND CIRCUIT FOR CONTROLLING THE OPERATING POINT OF A VIDEO AMPLIFIER

[75] Inventor: Wilfried Schiller, Hildesheim, Fed. Rep. of Germany

[73] Assignee: Blaupunkt-Werke GmbH, Hildesheim, Fed. Rep. of Germany

[21] Appl. No.: 8,310

[22] Filed: Jan. 29, 1987

[30] Foreign Application Priority Data

Mar. 26, 1986 [DE] Fed. Rep. of Germany ....... 3610190

[51] Int. Cl.$^4$ ............................ H01J 29/52; H01J 1/02
[52] U.S. Cl. ..................................... 315/383; 358/29; 358/65; 358/219
[58] Field of Search .............................. 315/383–386; 358/21 V, 184, 219, 243, 34, 65, 74, 29, 242

[56] References Cited

U.S. PATENT DOCUMENTS

| | | | |
|---|---|---|---|
| 4,340,904 | 7/1982 | Wingrove, Jr. | 358/10 |
| 4,404,409 | 9/1983 | Ryan | 315/403 |
| 4,723,158 | 2/1988 | White | 315/383 |

Primary Examiner—Theodore M. Blum
Assistant Examiner—Gregory C. Issing
Attorney, Agent, or Firm—Frishauf, Holtz, Goodman & Woodward

[57] ABSTRACT

When controlling the working point of video output stages in monitors, data display cathode ray tubes (CRTs) (10) and the like, in which the scanning raster is applied to the screen of the CRT entirely on the visible portion of the screen, and to permit control of the working point of the video output stage by strobing the beam current at a high brightness level, the vertical deflection of the beam during not-needed lines is so controlled that the beam is deflected beneath a still remaining frame or beyond the phosphor layer of the screen. The deflection is obtained by an additional auxiliary deflection pulse derived, for example, from a monostable multivibrator (45) receiving a pulse close to the beginning of the selected line, and superimposing its pulse to the deflection of the deflection current for the vertical coil 42.

10 Claims, 3 Drawing Sheets

METHOD AND CIRCUIT FOR CONTROLLING THE OPERATING POINT OF A VIDEO AMPLIFIER

Reference to related allowed application, assigned to the assignee of the present application, the disclosure of which is hereby incorporated by reference: U.S. Ser. No. 008,307, filed Jan. 29, 1987, GRONAU et al.

The present invention relates to television amplifiers, and more particularly to color television amplifier circuits, and especially to a circuit arrangement to control the operating point of a color television amplifier.

BACKGROUND

Various circuits to control the operating point of color television circuits are known. Usually, to control the operating point of an output stage which, in turn, provides control current to the cathode of a television tube, a voltage representative of beam current is obtained and compared with a comparison reference. The result of the comparison is stored during the subsequent field of half-frame of a video image and the operating point of the video output amplifier is controlled as a function of the stored value. The test of the beam current is carried out during scanning of a line within the vertical scanning interval, just after the vertical retrace of flyback of the beam.

Image viewing-type television apparatus, for example for home use or the like, usually use a scanning pattern which is somewhat larger than the area visible to the viewer, that is, the area which is left blank from between the frame. Thus, the scanned pattern is written on the screen in a region which is larger than that which is actually visible. It is, thus, readily possible to test the beam current at the beginning of the first line, after vertical flyback or retrace, in order to obtain a suitable measuring value for comparison with the reference, which may cause distortion on the screen. This distortion, however, is not visible to the viewer because the first line is, at least in part, blanked by the frame of the television apparatus.

Data output apparatus display the entire scanned pattern on the screen. Thus, testing and scanning for the beam current in order to obtain a measuring line, so that a voltage value representative of beam current can be obtained, cannot be carried out at the edges of the scanned pattern without also rendering visible that particular line.

Data monitors and data display apparatus, thus, in order to prevent interference with a scanning line which is being displayed, frequently did not utilize known TV-type control apparatus to control the operating point of video output stages.

THE INVENTION

It is an object to permit incorporation of an operating point control circuit which utilizes a voltage representative of beam current as a measured value, without interfering with the reproduction of desired indicia or information on the screen of a cathode ray tube, so that no disturbance of the measured line or lines becomes visible.

Briefly, a time interval is selected to measure the cathode current, which time interval is not needed for presentation of information on the screen of the cathode ray tube. The vertical deflection current to the cathode ray tube is then so controlled that the cathode ray beam, during that time interval, is deflected on a portion of the cathode ray tube screen which is not visible.

In accordance with a feature of the invention, the deflection to the not visible portion may be behind a portion of the screen which is covered by a frame in which the cathode ray tube (CRT) is enclosed. This embodiment can be used appropriately and desirably in the customary color monitors which have a framed CRT.

In accordance with another embodiment of the invention, the selected lines are written outside of the active CRT screen area, that is, in an area where there are no phosphor deposits. Thus, the invention can be used in that mode with apparatus using a CRT without a frame covering at least the edges of the CRT.

DRAWINGS

In all drawings, similar elements have been given the same reference numerals.

DETAILED DESCRIPTION

Figure 1:
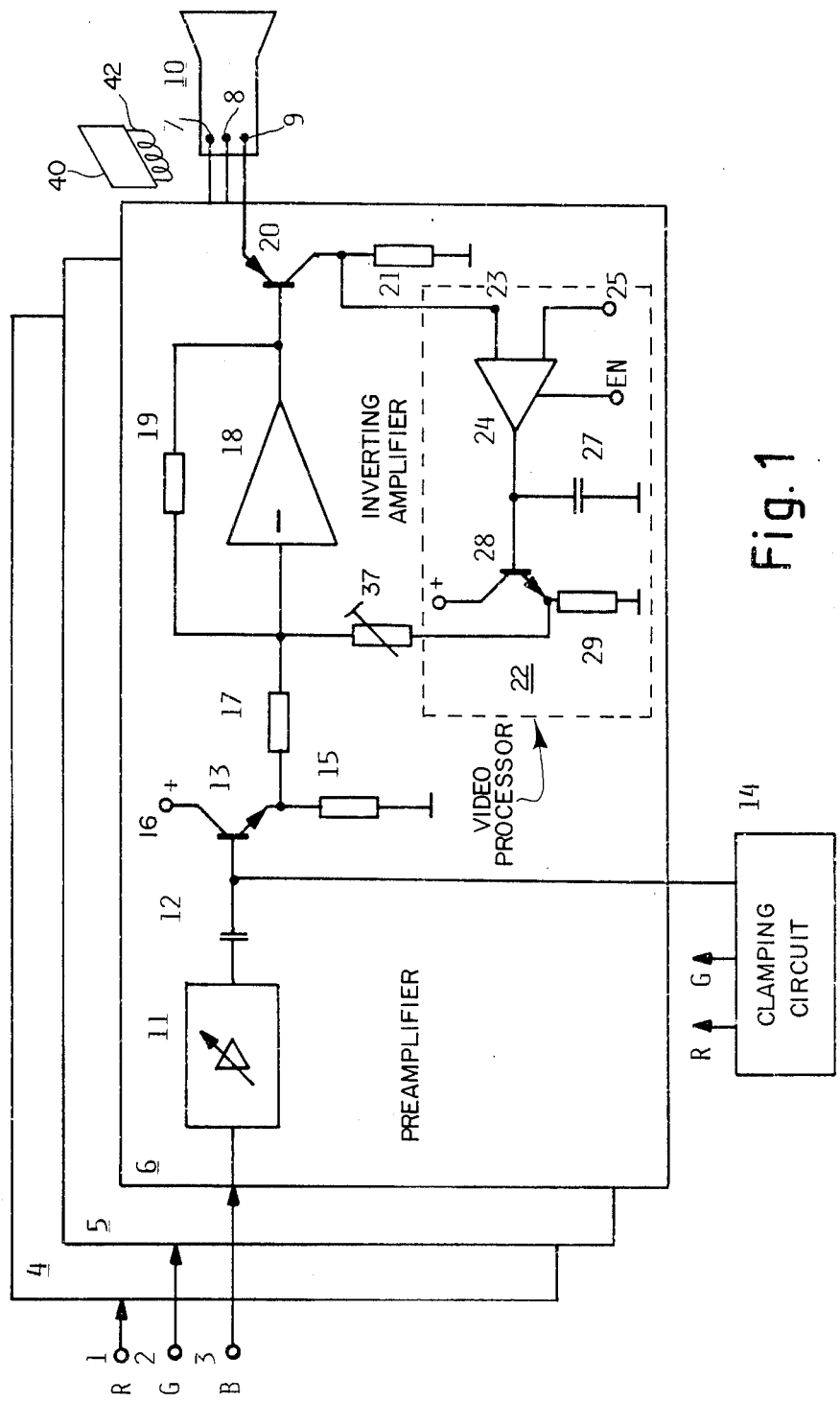
FIG. 1 is a schematic diagram of a circuit to control the operating point of a video output stage.

Referring first to FIG. 1, which generally illustrates the principle of control of the operating or working point of a CRT output amplifier. The referenced copending application, assigned to the assignee of the present invention, U.S. Ser. No. 008,307, filed Jan. 29, 1987, GRONAU et al describes this circuit in greater detail.

Inputs 1, 2, 3 receive the chromaticity signals R, G, B which are connected to video amplifiers 4, 5, 6. The outputs from the video amplifiers ae connected to the respective cathodes 7, 8, 9 of a color cathode ray tube (CCRT) 10.

The amplifiers 4, 5, 6 are identical; thus, only the amplifier 6 will be described in greater detail. Input 3 connects the chromaticity signals to a video preamplifier which has a controllable amplification factor, so that contrast control is possible. The arrow through the amplifier symbol represents amplification control. The output of the video preamplifier 11 is coupled over a capacitor 12 with the base of a transistor 13 connected as an emitter-follower. A clamping circuit 14 connects, periodically, the base of the transistor 13 with a source of constant voltage during the line retrace, so that the video signals receive constant d-c value, as well known. Clamping circuit 14 is similarly connected to the video amplifiers 4, 5, as schematically indicated by the arrows R, G.

Emitter-resistor 15 connects the emitter of the transistor 13 with ground, chassis or reference potential; the collector of transistor 13 is supplied from the positive source of supply 16. A coupling resistor 17 couples the video chromaticity to the input of an inverting amplifier 18, whose idling or low signal amplification is so high that the effective amplification approximately corresponds to the ratio between the feedback resistor 19 and the coupling resistor 17. The output of the amplifier 18 provides video signals which have an amplitude already sufficient to control the CCRT 10. The output signals are coupled to the cathode 9 of the CCRT 10 through an output transistor 20.

A resistor 21, connected between the collector of transistor 20 and chassis or reference potential, provides a dropping resistor so that a voltage can be taken off the resistor 21 which is representative of beam current in the CRT. This beam current is connected to a video processor control circuit to control the operating point of the video amplifier 18, 20.

The voltage taken off resistor 21 is applied to one input 23 of a difference amplifier 24, the other input of which is connected to a reference voltage 25.

The difference amplifier 24 is a switchable operational amplifier. The difference amplifier 24 is so arranged that the output 26 thereof will have a signal available thereon only when an enabling input EN has an appropriate signal thereon. During all the remaining time, the output 26 is a high resistance output. The switching terminal EN receives a strobing pulse which corresponds to an active line within the vertical frequency scanning interval just after the beam retrace. During this time, then, the result of the difference formation between the voltage representative of cathode current and the reference voltage from terminal 24 is available at the output terminal 26 and used to charge a capacitor 27 to the respective value. The switchable difference amplifier 24 and the capacitor 27, together, thus form a sample-and-hold circuit.

The voltage across capacitor 27 is applied to the base of a transistor 28 which, together with resistor 29, is connected as an impedance conversion or matching circuit. The base of the transistor 28 forms a high impedance input, so that the charge of the capacitor 27 during a field is practically invarying and constant.

The control voltage is applied over an adjustable resiistor 37 to the input of the inverting amplifier 18. The value of the resistor 37 can be changed so that the amplification of the loop formed by the video processor 22 and the video amplifier 18, 20 can be controlled without changing the amplification of the video chromaticity signal applied by the transistor 13.

The video processor 22 which, for example, may be a standard integrated circuit of the commercial designation TDA 3301 is provided in triplicate, one each such circuit—which may be on one integrated chip - for each one of the amplifiers 4, 5, 6, as more fully explained in the referenced copending application assigned to the assignee of the present invention. The control signals applied by the resistor 37 from the video processor are superimposed on the video chromaticity signal from the transistor 13.

Figure 2:
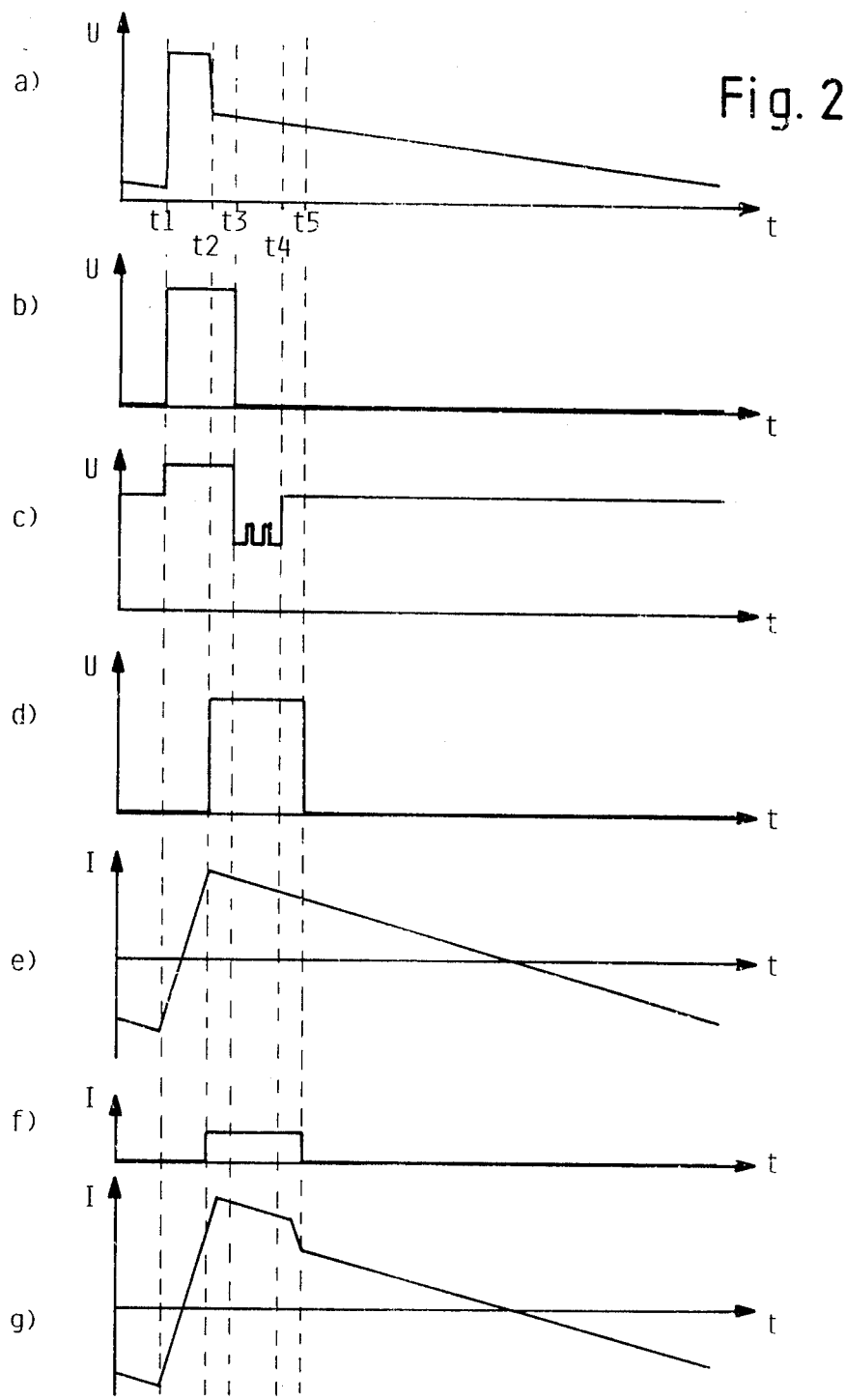
FIG. 2 illustrates, in a series of graphs to an identical time scale, voltages and currents arising when the method of the present invention is carried out.

Referring now to FIG. 2, which illustrates diagrams of voltage and current during one vertical scanning interval.

Graph a illustrates the output voltage of a vertical deflection circuit 40 (FIG. 1) connected to a vertical deflection coil 42. The vertical retrace occurs during a time interval t1 and t2. Due to the inductance of the deflection coil 42, and the more rapid change in current during the retrace, a voltage pulse will occur between the intervals t1 and t2. During the vertical scan, the output voltage of the vertical deflection circuit is, essentially, linear with respect to time.

To be able to scan the entire retrace or flyback, including a possible disturbed beginning of the scanning trace of the cathode beam, the CCRT 10 receives a scanning pulse at vertical frequency, as shown in the graph b, which has a time duration until the time t3.

The cathode beam is released for one or more lines subsequent to scanning the beam—as explained in connection with FIG. 1—by a pulse or pulses shown in graph c of FIG. 2. If the release is for a plurality of lines, the cathode beam is scanned in accordance with horizontal frequency between the lines.

As previously explained, television viewing apparatus usually use a scanning pattern which is so large that it extends slightly beyond the frame which covers the edge of the video tube. The upper edge of the scanning beam, thus, is not visible in the ordinary entertainment type of television, so that lines which have to be scanned at high brightness in order to obtain beam control, will not appear disturbing within the image beign protrayed. Monitors, however, used for data or graphic representation of data, utilize a scanning pattern which is smaller so that the entire scanned pattern is visible.

In accordance with the present invention, the electron beam is additionally deflected during scanning, so that the disturbing bright testing of measuring lines, necessary for obtaining a control voltage for beam current control, is avoided. Any known pulse generating circuit, thus, can be used to provide pulses in accordance with the graph d of FIG. 2—to be described in greater detail below.

Due to inertia, resulting from the inductance of the vertical deflection coil, the pulse starts already at time t2, that is, before the measuring line actually starts at t3. In order to provide for reliability, the trailing flank of the pulse ends at t5, that is, slightly after the end of the measuring line at t4.

The diagram e illustrates the course of the vertical deflection current in customary scanning. The pulse shown in the graph d is used to obtain a current pulse as shown in graph f, which is superimposed over the customary vertical deflection current, so that the combined vertical deflection current shown in the graph g is obtained. At the beginning of the trace at vertical frequency, that is, at the upper edge of the raster, the beam thus will be controlled to jump upwardly by a predetermined value, so that the lines which are scanned at high brightness, in order to obtain beam current control, are written on a portion of the screen which either is covered by even the small frame of a monitor-type CCRT or, in CCRTs which do not have a frame at all, in a region which does not form part of the active screen area, that is, a screen portion which does not have luminescent phosphor applied thereto.

At the time t5, the beam again reverts to the vertical position which is provided by the usual sawtooth wave vertical deflection current. That portion of the scanning pattern, provided to display the information content of the video signals, thus remains unchanged.

Figure 3:
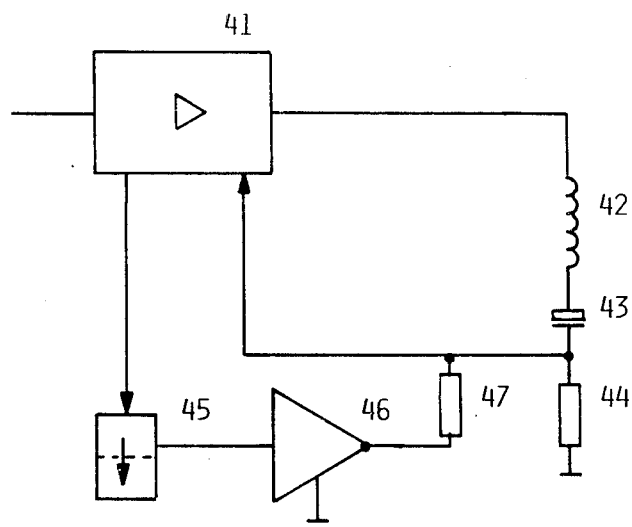
FIG. 3 is a detailed circuit diagram of an embodiment to carry out the present invention.
Figure 4:
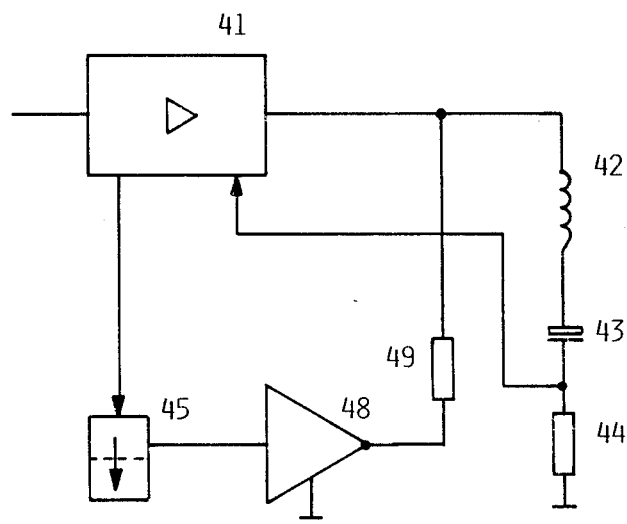
FIG. 4 is a detailed circuit diagram of another embodiment to carry out the concept of the present invention.

Referring now to FIGS. 3 and 4, which illustrate the system 40 in detail. A vertical deflection circuit 41 is connected to the vertical deflection coil 42, which is serially connected to a capacitor 43 and a feedback resistor 44. A voltage is available across feedback resistor 44 which is applied to a control input of the vertical deflection circuit 41. Since the voltage at the feedback resistor 44 corresponds to the current in the vertical deflection coil, the vertical deflection current can be so controlled that the vertical deflection is highly linear.

In accordance with the present invention, a pulse at vertical frequency is obtained and connected to a pulse generating circuit 45, for example a monostable flip-flop (MFF), the output pulse of which is illustrated in graph d of FIG. 2. This pulse is applied to an amplifier 46 (FIG. 3), the output of which is connected through coupling resistor 47 with the feedback path of the vertical deflection circuit.

OPERATION

While the control pulse derived from the MFF 45 is available, amplifier 46 provides an output. Amplifier 46 and resistor 47 are connected in parallel to the resistor 44. The resulting resistance value thus is less, so that the voltage applied to the vertical deflection circuit 41 likewise is less. The vertical deflection circuit 41, thus, receives a modified signal which simulates a smaller deflection current, thus increasing the deflection current through coil 42 and causing the composite output as shown in graph g of FIG. 2.

The circuit of FIG. 4 carries out the method in a different way; again, the vertical deflection circuit 41, deflection coil 42, capacitor 43, and feedback resistor 44 are connected as described in connection with FIG. 3. The MFF 45 provides the control pulse—FIG. 2, graph d—which controls an amplifier 48. In contrast to the circuit of FIG. 3, however, the amplifier 48 does not interfere with the feedback loop of the circuit but, rather, provides additional current via coupling resistor 49 directly to the deflection coil 42.

Various changes and modifications may be made, and features described in connection with any one of the embodiments may be used with any of the others. For example, rather than using the amplifiers 46, 48 (FIGS. 3, 4), semiconductor switches could be provided. Further, superimposition of a current pulse over the sawtooth deflection current, as shown in FIG. 4, can be done in different circuit configurations than the one shown. Suitable gates and isolating circuits, to prevent mutual interference of circuitry, have been omitted from the drawings since their use is well known engineering expedient.

What is claimed is:

1. A method of controlling the operating point of a video amplifier (18, 20) in a data monitor whose raster scan outline normally falls entirely on a visible portion of a screen of a cathode ray tube (CRT) (10) forming part of said monitor,
utilizing the steps of
measuring cathode beam current and controlling the amplification of the amplifier as a function of measured cathode beam current,
and comprising, in accordance with the invention, the steps of
selecting a time interval for said cathode beam current measuring step, which time interval is not needed for presentation of information on the CRT screen; and
controlling the vertical deflection current to deflect the cathode ray beam during said time interval onto a portion of the CRT screen which is outside of the luminescent-material-coated portion of the screen.

2. The method of claim 1, wherein the step of controlling the vertical deflection current comprises
generating a pulse having a time duration of approximately said time interval;
and superimposing said pulse over the vertical deflection current at the beginning of the deflection period at vertical deflection frequency.

3. A circuit arrangement to control the operating point of a video output amplifier (18, 20) in a data monitor whose raster scan outline normally falls entirely on a visible portion of a screen of a cathode ray tube (CRT) (10) forming part of said monitor,
having means (20, 21, 23, 24, 25) for measuring cathode beam current and means (26, 27, 28, 29, 37) controlling the operating point and amplification of the output amplifier as a function of measured beam current,
and comprising, in accordance with the invention,
means (45) for selecting a time interval during which said cathode current is measured, which time interval is selected during a time which is not needed for presentation of information on the CRT screen; and
means (46, 47; 48, 49) for controlling the vertical deflection current through a vertical deflection coil (42) deflecting the cathode ray beam during that time interval, as controlled by said time interval selection means, onto a portion of the CRT screen which is outside of the luminescent-material-coated portion of the screen.

4. The circuit arrangement of claim 3, wherein said time interval selection means comprises a time-controlled pulse generating element (45);
and said means for controlling the vertical deflection current comprises a connecting circuit (46, 47; 48, 49) connecting the output of said time-controlled pulse generating element to a vertical deflection circuit (41) generating a sawtooth deflection current, and superimposing the pulse generated by said time-controlled pulse generating element (45) on the current flowing through the vertical deflection coil (42) of the CRT (10).

5. The circuit arrangement of claim 3, wherein (FIG. 3) a feedback resistor (44) is connected in a vertical deflection circuit, including a vertical deflection coil (42);
and wherein said means for controlling the vertical deflection current comprises impedance means (47) selectively connectable in parallel with the feedback resistor (44) under control of said time interval selection means.

6. The circuit arrangement of claim 5, wherein said time interval selection means comprises a time-controlled pulse generating element (45), an amplifier (46) coupled to the output of said time-controlled pulse generating element, the output of said amplifier being connected to said impedance means.

7. The circuit arrangement of claim 3, wherein (FIG. 4) a vertical deflection stage is provided including a vertical deflection amplifier (41) generating an essentially linear sawtooth wave current applied to a vertical deflection coil (42) coupled to the CRT (10);
and wherein the control means (48, 49) comprises a current source (48, 49) controlled by said time interval selection means (45) and providing current pulses to said vertical deflection stage and to said deflection coil (42).

8. The circuit arrangement of claim 7, wherein said means for selecting a time interval comprises a time-controlled pulse generating element (45) coupled to and controlled by said vertical deflection amplifier (41) and generating pulses of a predetermined time interval and at a predetermined timing with respect to said sawtooth wave, and connected to and controlling said current source (48, 49).

9. The circuit arrangement of claim 8, wherein said current source (48, 49) is connected to a connection terminal of said vertical deflection coil (42).

10. The circuit arrangement of claim 7, wherein the means for controlling the vertical deflection current comprises an amplifier (48) and a coupling resistor (49) coupled to the amplifier, the coupling resistor being connected to a terminal of a vertical deflection coil (42) coupled to the CRT (10);

and wherein the time interval selection means comprises a time-controlled pulse generating element (45) having its output connected to said amplifier (48) and its input connected to and controlled by a vertical deflection circuit (41) of the CRT (10).

* * * * *